A. J. ROWLEDGE.
VARIABLE SPEED GEAR.
APPLICATION FILED JULY 11, 1916.

1,256,374.

Patented Feb. 12, 1918.

Inventor
Arthur J. Rowledge
by Foster Freeman Watson & Coit
Attys

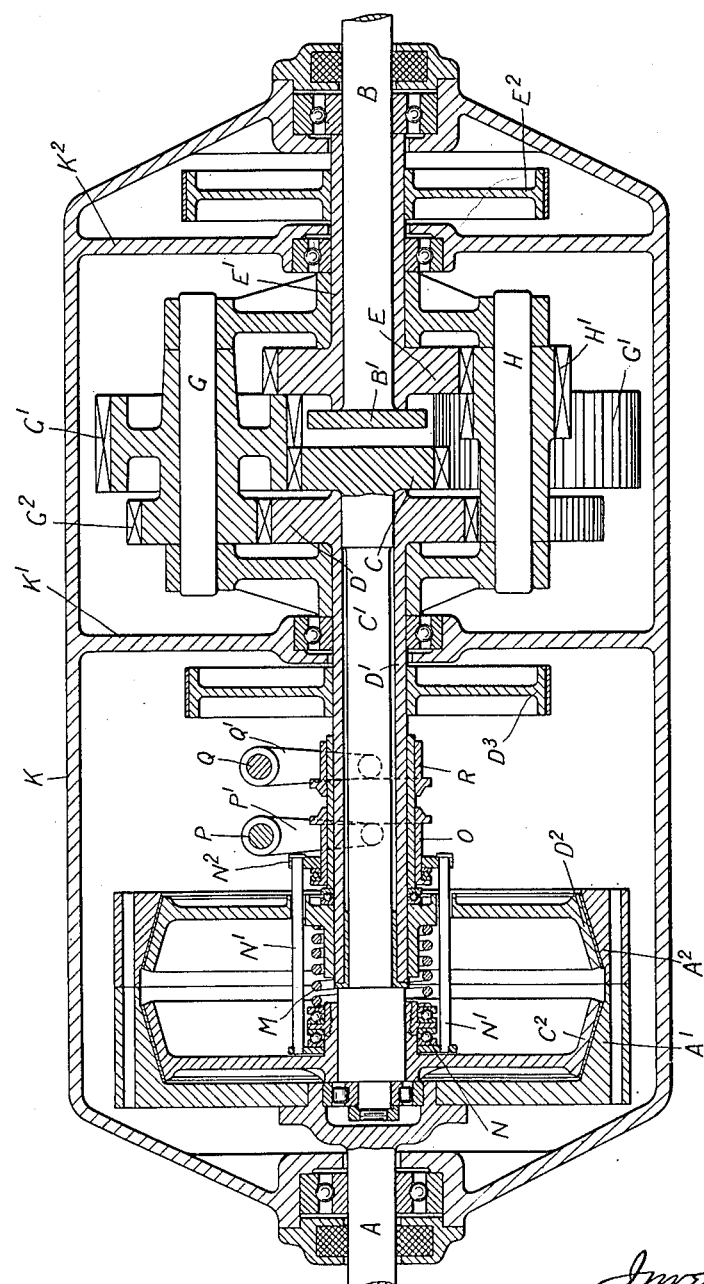

UNITED STATES PATENT OFFICE.

ARTHUR JOHN ROWLEDGE, OF LONDON, ENGLAND, ASSIGNOR TO D. NAPIER & SON LIMITED, OF LONDON, ENGLAND.

VARIABLE-SPEED GEAR.

1,256,374.  Specification of Letters Patent.  Patented Feb. 12, 1918.

Application filed July 11, 1916. Serial No. 108,746.

*To all whom it may concern:*

Be it known that I, ARTHUR JOHN ROWLEDGE, a subject of the King of England, residing at London, in England, have invented certain new and useful Improvements in Variable-Speed Gears, of which the following is a specification.

This invention relates to variable speed gear of the spur wheel epicyclic type in which the speed variations are effected by means of clutches and brakes which are operative on certain members of the gear and has for its object to provide a simple form of such gear which will enable three speeds to be obtained in the forward direction and a reverse.

According to this invention the driving and driven shafts are disposed coaxial and to the driven shaft are connected two planetary members so arranged that one wheel of one planetary member gears with the other wheel of the other member. A set of separate sun wheels are all mounted coaxial with but separate from the driving and driven shafts some of these wheels gearing with the wheels of one planetary member and one of them gearing with the other planetary member. Two clutches and two brakes so control the several sun wheels by imparting rotation through the clutches and by locking certain of them by the brakes that power will be transmitted through the planetary members with a differential action through the driven shaft and the latter can be driven at the desired predetermined speeds.

It will be understood that while the employment of two planetary members is particularly indicated one or both of these members may be duplicated for convenience and balancing purposes.

One planetary member comprises two integral spur wheels while the other member is formed of a single spur wheel. The total number of wheels in the two essential planetary members is thus three. The two wheels of the one planetary member are of different sizes and the wheel of the second planetary member may differ in size from either of the wheels composing the first planetary member or it may be of the same size as the larger wheel in the first planetary member. In either case the single wheel of the one member gears with the larger of the two wheels of which the other member is composed.

The number of sun wheels in the gear is three and these wheels may be of either two or three different sizes. Thus in some cases two of the sun wheels may form a pair but in other cases these wheels may all be of different sizes, this difference in size having for its object the obtainment of certain desirable speed ratios.

Two of the sun wheels are so arranged that by means of clutches they can be separately coupled to the driving shaft. One of these wheels which can be thus driven is also provided with a brake by means of which it can be held against rotation. The remaining sun wheel is provided with a brake by means of which it can be held against rotation.

The accompanying drawings illustrate by way of example two constructions of variable speed gear in accordance with this invention. For convenience and for the sake of clearness these drawings are to a considerable extent diagrammatic.

In these drawings,

Fig. 5 is a longitudinal sectional elevation of a modified form of three speed gear constructed in accordance with this invention and arranged to be controlled by mechanical clutches and brakes.

Like letters indicate like parts throughout the drawings.

In the construction illustrated in Figs. 1 to 4 inclusive which is arranged to provide three speeds in the forward direction and a reverse the motor or driven shaft A has mounted upon it two clutch members A' A² which in this case are of the electromagnetic type. Coaxially disposed with relation to the driving shaft A is the driven shaft B. A toothed wheel C is secured on one end of a shaft C' the other end of which carries a clutch member C² adapted to engage the driving clutch member A'. The shaft C' is disposed coaxial with the driving and driven shafts A and B and between the ends of these two shafts. This wheel C constitutes one of the sun wheels of the gear and may be conveniently referred to as the first driving sun wheel. A toothed wheel D of larger diameter than the wheel C is mounted on one end of a sleeve D' carried loosely on the shaft C'. On the other end of the sleeve D' is a member D² so formed as to serve the double purpose of a brake member and a clutch member which is adapted to engage the clutch member A² for driving purposes. The wheel D may be referred to as the second driving sun wheel.

Toward the end of the driven shaft B is a toothed wheel E which in this construction is shown as being of the same size as the wheel C. The wheel E is mounted on one end of a sleeve E' loosely carried on the driving shaft B. At the opposite end of the sleeve E' is a brake member E². It will thus be seen that of the three sun wheels with which the gear is provided two of these namely the wheels C and D can be separately driven and the latter can also have a brake applied to it so as to prevent it from rotating, the other wheel E can be left free or held by its brake against rotation—no means being provided for directly driving it.

Figure 2:
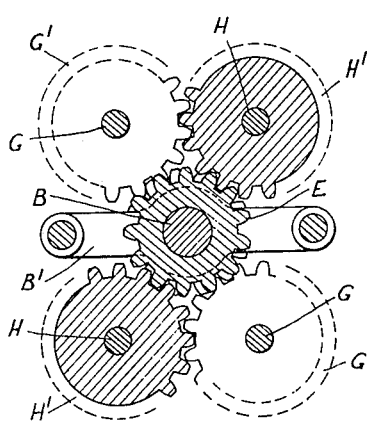
Fig. 2 is a diagrammatic transverse section on the line 2—2 of Fig. 1 looking in the direction indicated by the arrows and illustrating the two pairs of planetary members preferably employed and how the wheels of these members gear with each other and with the sun wheels.
Figure 3:
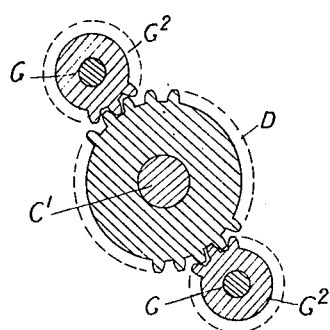
Fig. 3 is a diagrammatic transverse section on the line 3—3 of Fig. 1 showing only one pair of planetary members and the sun wheel with which they engage.
Figure 4:
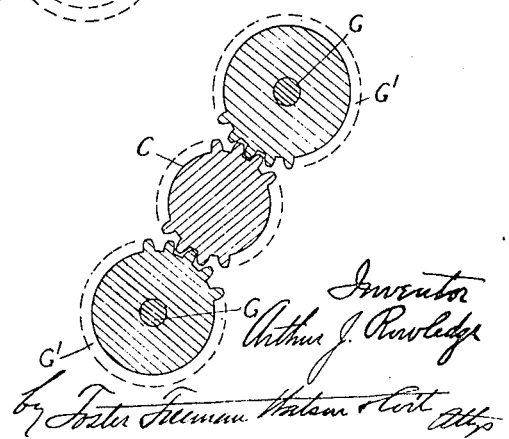
Fig. 4 is a diagrammatic transverse section on the line 4—4 of Fig. 1 showing the other pair of planetary members only and how the wheels in these members gear with one of the sun wheels.

One planetary member is comprised by a spindle G on which are loosely mounted two integral spur wheels G' and G². The other planetary member is comprised by a spindle H on which is loosely mounted a spur wheel H'. The ends of the spindles G and H are carried by two members J and J' which are respectively supported, if desired with ball or roller bearings interposed, on the sleeves D' and E'. The planetary members are connected to the driven shaft B by a spider or cross piece B' mounted on the end of the driven shaft B. The two portions of this cross-piece B' pass outwardly between the planet wheels as shown in Fig. 2 and at their ends engage rods B² which are firmly attached at their ends to the end members or carriers J and J' of the planetary system. Thus rotary motion imparted to the planetary members about the gear axis is communicated to the driven shaft B.

For convenience each planetary member G' G² and H' is duplicated the pairs of members being oppositely disposed about the gear axis as shown in Fig. 2. The planet wheels G' and H' are of extra breadth and gear together over approximately one half of their width in substantially the plane of the cross-piece B'. The other half of the width of the planet wheel G' gears with the first driving sun wheel C while the other half of the planet wheel H' gears with the sun wheel E. The smaller planet wheel G² gears with the second driving sun wheel D.

Figure 1:
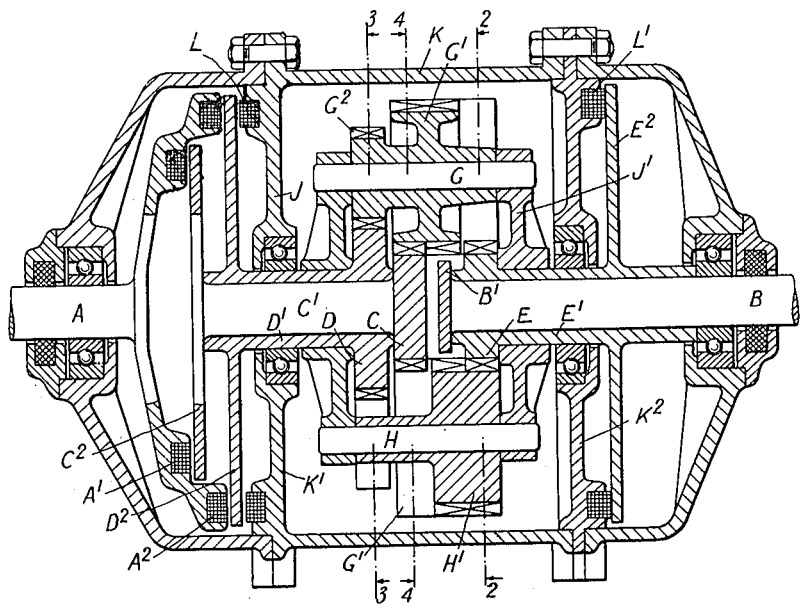
Figure 1 is a longitudinal sectional elevation of one construction of a three speed gear in accordance with the present invention, electromagnetic clutches and brakes being shown as the means by which the variations in the speed are brought about.

In the form of the gear illustrated in Fig. 1 the planet wheels G' and H' are of the same diameter as the two sun wheels C and E are of the same diameter. These two sun wheels thus form a pair as also the two planet wheels G' and H', but the sizes of these wheels may differ as shown in the construction illustrated in Fig. 5. When these wheels are thus made similar and in pairs some simplification will be effected in the manufacture of the wheels but on the other hand the speed ratios which are most desirable may not then be obtainable. Hence a departure from this symmetrical arrangement may be necessary as in the construction illustrated in Fig. 5 in order to enable certain definite speed ratios to be provided.

A fixed casing K incloses the whole gear together with the clutch and brake members. This casing is provided with partitions K' and K² which divide the interior of the casing into three compartments in the center one of which lie all the gear wheels. In that compartment which is on the driving shaft side of the gear compartment are disposed the clutch members A' A², C² and D² and on the partition K' is arranged a fixed brake member L adapted to engage the rotatable member D² which serves the double purpose of a clutch member and a brake member. In the compartment at the other side or end of the gear wheels lies the rotatable brake member E² and a corresponding fixed brake member L' is arranged in this compartment being mounted on the partition K². The partition K' extends inwardly to the sleeve D' a ball or roller bearing being conveniently here disposed. Similarly the partition K² extends inwardly to the sleeve E' with a ball or like bearing arranged here also. By thus dividing up the casing K it is possible to so isolate the gear wheels that fragments of metal which may be worn off the clutch and brake members and other foreign matter which may be present in the end compartments is prevented from entering the central gear compartment and by getting into the oil which surrounds the gear wheels cause risk of damage to the gears. It also becomes possible to supply oil to or run dry the clutch and brake members which are arranged in the separate end compartments.

This separation of the clutch and brake members from the gear wheels is particularly advantageous where the clutches and brakes are as illustrated in this construction of the electromagnetic type but it is also useful where mechanically operated clutches and brakes are employed.

The various speeds are obtained in the following manner in a gear thus constructed. It will be understood that in each case only those clutch and brake members which are indicated are operative the other clutch and brake members being out of action.

For the first or lowest speed the first sun wheel C is driven by engaging the clutch members A', $C^2$ while the wheel E is held against rotation by engagement of the brake members $E^2$ and L'.

For the second speed the wheel D is driven by engaging the clutch members $A^2$, $D^2$ and the wheel E is again held against rotation.

For the third speed the clutch members controlling both the wheels C and D are engaged so that both these wheels are driven with the result that the whole gear is locked and the drive is transmitted direct from the driving shaft A to the driven shaft B. No relative rotation of any of the wheels of the gear then occurs.

In order to obtain the reverse the first sun wheel C is driven and the second sun wheel D is held against rotation by applying the brake L to the member $D^2$.

Fig. 5 illustrates a modified form of the improved gear in which the wheels C and E are shown as being of different sizes while the sizes of the planet wheels G' and H' also differ the object being to obtain different speed ratios. The operation and arrangement of the wheels is as already described but this gear is shown as being controlled by mechanical clutches and brakes the construction and arrangement of which is set forth by way of example as other constructions and arrangements may be adopted.

The clutches as illustrated are of the cone type but they may be plate clutches or of the expanding type. The cone clutch member $C^2$ is carried on the end of the shaft C' so that it can slide axially thereon. The clutch member $D^2$ is similarly carried on the sleeve D'. Between the hubs of these clutch members is disposed a coiled spring M which presses equally in opposite directions the two cones against the hollow conical clutch members A' $A^2$ which are mounted on the driving shaft A. Between that end of the spring M which is directed toward the clutch $C^2$ and the hub of this clutch member is a loose collar N connected by rods N' disposed parallel to the gear axis with a loose collar $N^2$ disposed on an axially sliding sleeve O mounted on the sleeve D'.

The rods N' pass freely through openings in the clutch member $D^2$. On a rockshaft P is mounted a lever P' which engages the sleeve O in some convenient manner so that when the shaft P is rocked the sleeve O can be moved axially. When thus moved to the right the spring M will be compressed and the clutch member $C^2$ disengaged from the clutch member A' by reason of the pull exerted through the rods N'. When the rockshaft P is freed the spring M will cause the clutch members $C^2$ and A' to engage. A second rockshaft Q carries a lever Q' which engages in some convenient manner a sleeve R mounted so that it can slide axially on the sleeve D'. This sleeve R actually lies between the sleeve O and the sleeve D' and the end of the sleeve R bears against the hub of the clutch member $D^2$. When the shaft Q is rocked the sleeve R will be moved toward the left as shown in the drawing and the spring M will consequently be compressed as the clutch member $D^2$ is moved out of engagement with the clutch member $A^2$. On releasing the rockshaft Q the clutch members $A^2$ and $D^2$ will again come into engagement. By means of this clutch mechanism it is possible to engage or hold out of engagement the two clutch members $C^2$ and $D^2$ either separately or simultaneously. This method of arranging and operating the clutches is similar to certain known clutch constructions and as mentioned is illustrated by way of example to show how mechanically operated clutches may be employed for controlling the improved gears in order to effect the necessary speed variations.

The mechanically operated brakes employed in this case may be of any suitable type but as illustrated they comprise a drum such as $D^3$ mounted on the sleeve D' and a drum $E^2$ mounted on the sleeve E'. To each of these drums may be applied in some convenient manner a contracting brake band which is not shown in the drawings. Brakes of the expanding or other type may however be employed if desired. These brakes and clutches are conveniently operated by pedals levers or other suitable mechanism so arranged as to enable the clutches and brakes to be manipulated in the combinations necessary to effect the desired speed changes.

The several speeds in this gear are obtained in the following way:—

For the first speed the sun wheel C is driven by engaging the clutch members A' and $C^2$ while the sun wheel E is fixed by applying the brake to the drum $E^2$.

For the second speed the sun wheel D is driven by engaging the clutch members $A^2$ and $D^2$ while the sun wheel E is again fixed.

For the third speed which gives a direct drive both sun wheels C and D are driven by bringing both clutch members $C^2$ and $D^2$ into engagement with the corresponding clutch members A' and A². The wheels of the gear are then locked and no relative rotation takes place.

To obtain the reverse the sun wheel C is driven while the sun wheel D is fixed by applying the brake to the drum D³.

The constructions more particularly illustrated and described above show the arrangements and relative sizes of the gear wheels which are preferred in putting the invention into practice but without departing from the spirit of the invention the relative sizes of the wheels may be varied and such variation may necessitate certain variations in the arrangement of the wheels. Also as indicated by varying the dimensions of the several wheels it becomes possible to obtain such speed ratios as may be desirable.

It will be understood that in place of the broad wheels with which the planetary members are provided as more particularly described above and shown in the drawings, in some cases it may be desirable to employ two wheels of less width and formed integral.

If as may be the case it is desirable to separate all the brake members from the clutches this may be effected by mere duplication of the sun wheel D and of the planet pinion C² with which it gears. Thus for example in the construction illustrated in Fig. 1 a wheel identical with the wheel D mounted on a sleeve such as D' and provided with a brake member such as D² would be arranged upon the driven shaft B. This extra sun wheel would be disposed outside the wheel E with its sleeve bearing on the sleeve E'. The brake member of the extra wheel would lie inside the brake member E² with the corresponding fixed brake member L suitably placed on the partition K². The necessary additional planet pinion with which the extra sun wheel must engage would be arranged on the spindle G according to the position of the extra sun wheel and at the side of the planet wheel G' opposite to that on which lies the pinion G² all three wheels being formed integral.

The clutches and brakes whether of the electromagnetic or mechanical type may be controlled in various ways as found convenient. In some cases it may be desirable to construct and arrange the clutches so that they are mechanically operated while the brakes are of the electromagnetic type or conversely electromagnetic clutches may be used in combination with mechanically operated brakes.

As already mentioned the drawings illustrate the constructions generally in a diagrammatic manner. It may be remarked however that in Fig. 1 is shown by way of example one method of constructing the casing K with the partitions K' and K² so as to permit of the mechanism within it being assembled.

What I claim as my invention and desire to secure by Letters Patent is:—

1. In an epicyclic variable speed gear of the spur wheel type with differential action, the combination of a driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and respectively gearing with the wheels of the planetary members, means for separately coupling certain of the sun wheels to the driving shaft, and means for separately holding certain of the sun wheels against rotation as set forth.

2. In an epicyclic variable speed gear of the spur wheel type with differential action, the combination of a driving shaft, two clutch members mounted on the driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and respectively gearing with the wheels of the planetary members, two clutch members corresponding to the clutch members on the driving shaft and operative to separately couple two of the sun wheels to the driving shaft, and two brakes operative to separately hold two of the sun wheels against rotation as set forth.

3. In an epicyclic variable speed gear of the spur wheel type with differential action, the combination of a driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and respectively gearing with the wheels of the planetary members, means for coupling one of the sun wheels to the driving shaft, means for holding one of the sun wheels against rotation, and means by which one of the sun wheels can be either coupled to the driving shaft or held against rotation as set forth.

4. In an epicyclic variable speed gear of the spur wheel type with differential action, the combination with a driving shaft, a driven shaft coaxial with the driving shaft, two planetary members, comprising wheels, connected to the driven shaft, of which the first comprises two integral wheels of different sizes and the second a single wheel which gears with the larger wheel of the first planetary member, a set of three separate sun wheels all mounted coaxially with but separate from the driving and driven shafts, one of these wheels gearing with one planetary member and two of them gearing with the wheels of the other planetary member, means for saparately coupling certain of the sun wheels to the driving shaft, and means for separately holding certain of the sun wheels against rotation as set forth.

5. In an epicyclic variable speed gear of the spur wheel type with differential action, the combination of a driving shaft, a driven shaft coaxial with the driving shaft, two planetary members, comprising wheels connected to the driven shaft, a wheel of one planetary member gearing with one of the wheels of the other member, a set of three separate sun wheels all mounted coaxially with but separate from the driving and driven shafts and arranged in two groups, one group gearing with one planetary member and the other group gearing with the other planetary member, means for separately coupling certain of the sun wheels to the driving shaft, and means for separately holding certain of the sun wheels against rotation as set forth.

6. In an epicyclic variable speed gear of the spur wheel type with differential action, the combination of a driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and grouped on either side of the connection between the end of the driven shaft and the planetary members, one group gearing with one planetary member and the other group gearing with the other planetary member, means for separately coupling certain of the sun wheels to the driving shaft, and means for separately holding certain of the sun wheels against rotation as set forth.

7. In an epicyclic variable speed gear of the spur wheel type with differential action, the combination of a driving shaft, two clutch members mounted on the driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and respectively gearing with the wheels of the planetary members, two clutch members corresponding to the clutch members on the driving shaft and operative to separately couple two of the sun wheels to the driving shaft, a brake operative to hold against rotation one of the sun wheels which can be clutched to the driving shaft, and a brake operative to hold against rotation the remaining sun wheel which cannot be clutched to the driving shaft as set forth.

8. In an epicyclic variable speed gear of the spur wheel type with differential action, the combination of a driving shaft, a driven shaft coaxial with the driving shaft, two planetary members, comprising wheels, connected to the driven shaft, a wheel of one planetary member gearing with one of the wheels of the other member, all the wheels of the two members being of at least two different sizes, a set of three separate sun wheels all mounted coaxially with but separate from the driving and driven shafts and respectively gearing with the wheels of the planetary members, means for separately coupling certain of the sun wheels to the driving shaft, and means for separately holding certain of the sun wheels against rotation as set forth.

9. In an epicyclic variable speed gear of the spur wheel type with differential action, the combination of a driving shaft, a driven shaft coaxial with the driving shaft, two planetary members, comprising wheels, connected to the driven shaft, a wheel of one planetary member gearing with one of the wheels of the other member, a set of three separate sun wheels of at least two different sizes all mounted coaxially with but separate from the driving and driven shafts and respectively gearing with the wheels of the planetary members, means for separately coupling certain of the sun wheels to the driving shaft, and means for separately holding certain of the sun wheels against rotation as set forth.

10. In an epicyclic variable speed gear of the spur wheel type with differential action, the combination of a driving shaft, a driven shaft coaxial with the driving shaft, two planetary members, comprising wheels, connected to the driven shaft of which the first comprises two integral wheels of different sizes and the second a single wheel which gears with the larger wheel of the first planetary member, a set of three separate sun wheels all mounted coaxially with but separate from the driving and driven shafts one of these wheels gearing with one planetary member and two of them gearing with the wheels of the other planetary member, means for coupling one of the sun wheels to the driving shaft, means for holding one of the sun wheels against rotation, and means by which one of the sun wheels can be either coupled to the driving shaft or held against rotation as set forth.

11. In an epicyclic variable speed gear of the spur wheel type with differential action, the combination of a driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and arranged in two groups, one group gearing with one planetary member and the other group gearing with the other planetary member, means for coupling one of the sun wheels to the driving shaft, means for holding one of the sun wheels against rotation, and means by which one of the sun wheels can be either coupled to the driving shaft or held against rotation as set forth.

12. In an epicyclic variable speed gear of the spur wheel type with differential action, the combination of a driving shaft, a driven shaft coaxial with the driving shaft, two planetary members, comprising wheels, connected to the driven shaft of which the first comprises two integral wheels of different sizes and the second a single wheel which gears with the larger wheel of the first planetary member, a set of three separate sun wheels all mounted coaxially with but separate from the driving and driven shafts and arranged in two groups, the two sun wheels forming one group gearing with the two wheel planetary member and the single sun wheel forming the other group gearing with the single wheel planetary member, means for separately coupling certain of the sun wheels to the driving shaft, and means for separately holding certain of the sun wheels against rotation as set forth.

13. In an epicyclic variable speed gear of the spur wheel type with differential action, the combination of a driving shaft, a driven shaft coaxial with the driving shaft, two planetary members, comprising wheels, connected to the driven shaft of which the first comprises two integral wheels of different sizes and the second a single wheel which gears with the larger wheel of the first planetary member, a set of three separate sun wheels all mounted coaxially with but separate from the driving and driven shafts and arranged in two groups on either side of the connection between the end of the driven shaft and the planetary members, the two sun wheels forming one group gearing with the two wheel planetary member and the single sun wheel forming the other group gearing with the single wheel planetary member, means for coupling one of the sun wheels to the driving shaft, means for holding one of the sun wheels against rotation and means by which one of the sun wheels can be either coupled to the driving shaft or held against rotation as set forth.

14. In an epicyclic variable speed gear of the spur wheel type with differential action, the combination with a driving shaft, two clutch members mounted on the driving shaft, a driven shaft coaxial with the driving shaft, two planetary members, comprising wheels, connected to the driven shaft of which the first comprises two integral wheels of different sizes and the second a single wheel which gears with the larger wheel of the first planetary member, a set of three separate sun wheels all mounted coaxially with but separate from the driving and driven shafts and respectively gearing with the wheels of the planetary members, two clutch members corresponding to the clutch members on the driving shaft and operative to separately couple two of the sun wheels to the driving shaft, a brake operative to hold against rotation one of the sun wheels which can be clutched to the driving shaft and a brake operative to hold against rotation the remaining sun wheel which cannot be clutched to the driving shaft as set forth.

15. In an epicyclic variable speed gear of the spur wheel type with differential action, the combination of a driving shaft, two clutch members mounted on the driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and arranged in two groups, one group gearing with one planetary member and the other group gearing with the other planetary member, two clutch members corresponding to the clutch members on the driving shaft and operative to separately couple two of the sun wheels to the driving shaft, a brake operative to hold against rotation one of the sun wheels which can be clutched to the driving shaft, and a brake operative to hold against rotation the remaining sun wheel which cannot be clutched to the driving shaft as set forth.

16. In an epicyclic variable speed gear of the spur wheel type with differential action, the combination of a driving shaft, two clutch members mounted on the driving shaft, a driven shaft coaxial with the driving shaft, two planetary members, comprising wheels, connected to the driven shaft of which the first comprises two integral wheels of different sizes and the second a single wheel which gears with the larger wheel of the first planetary member, a set of three separate sun wheels all mounted coaxially with but separate from the driving and driven shafts and arranged in two groups on either side of the connection between the end of the driven shaft and the planetary members, the two sun wheels forming one group gearing with the two wheel planetary member and the single sun wheel forming the other group gearing with the single wheel planetary member, two clutch members corresponding to the clutch members on the driving shaft and operative to separately couple two of the sun wheels to the driving shaft, a brake operative to hold against rotation one of the sun wheels which can be clutched to the driving shaft, and a brake operative to hold against rotation the remaining sun wheel which cannot be clutched to the driving shaft as set forth.

17. In an epicyclic variable speed gear of the spur wheel type with differential action, the combination of a driving shaft, two clutch members mounted on the driving shaft, a driven shaft coaxial with the driving shaft, two planetary members, comprising wheels, connected to the driven shaft, a wheel of one planetary member gearing with one of the wheels of the other member, a set of three separate sun wheels all mounted coaxially with but separate from the driving and driven shafts and respectively gearing with the wheels of the planetary members, two clutch members corresponding to the clutch members on the driving shaft and operative to separately couple two of the sun wheels to the driving shaft, a brake operative to hold against rotation one of the sun wheels which can be clutched to the driving shaft, a brake operative to hold against rotation the remaining sun wheel which cannot be clutched to the driving shaft, a casing inclosing the gear wheels the clutches and the brakes, and partitions in this casing which so divide it into compartments that the clutches and brakes are separated from the gear wheels as set forth.

In testimony whereof I have signed my name to this specification in the presence of two subscribing witnesses.

ARTHUR JOHN ROWLEDGE.

Witnesses:
PUTNAM EDWARD DUNBAR SHELBURN,
ARCHIBALD JOHN FRENCH.